United States Patent [19]
Socier

[11] Patent Number: 6,143,229
[45] Date of Patent: Nov. 7, 2000

[54] METHOD FOR MAKING A DISPENSING CLOSURE WITH A FINGER WELL FORMED AFTER MOLDING OF THE DISPENSING CLOSURE

[75] Inventor: Timothy R. Socier, Essexville, Mich.

[73] Assignee: AptarGroup, Inc., Crystal Lake, Ill.

[21] Appl. No.: 09/276,378

[22] Filed: Mar. 25, 1999

[51] Int. Cl.[7] .............................. B29C 53/02; B29C 69/02
[52] U.S. Cl. ........................ 264/295; 264/296; 264/319; 264/339; 425/324.1; 425/383; 222/546; 222/556; 428/542.8
[58] Field of Search .................................... 264/265, 274, 264/295, 296, 319, 339; 222/556, 546; 220/334, 337, 338, 341; 425/324.1, 383; 428/34.1, 542.8

[56] References Cited

U.S. PATENT DOCUMENTS

| | | |
|---|---|---|
| 3,271,490 | 9/1966 | Cattaneo . |
| 4,249,674 | 2/1981 | Antenore .................................. 222/153 |
| 4,340,352 | 7/1982 | Hayberg .................................. 425/517 |
| 5,008,066 | 4/1991 | Mueller .................................... 264/537 |
| 5,642,824 | 7/1997 | Hess, III et al. ........................ 215/235 |
| 5,960,987 | 10/1999 | Solland et al. ........................... 220/834 |
| 6,039,224 | 3/2000 | Dallas, Jr. et al. ....................... 222/565 |

*Primary Examiner*—Jan H. Silbaugh
*Assistant Examiner*—Michael I. Poe
*Attorney, Agent, or Firm*—Rockey, Milnamow & Katz, Ltd.

[57] ABSTRACT

A method for making a dispensing structure with a finger well formed after molding of the dispensing structure for a container that has an opening to the container interior. The dispensing structure includes a body or base for extending around the container opening and for defining a dispensing orifice. A lid is molded from at least one synthetic polymer material and is hingedly connected to the body for movement between (1) a closed position over the body dispensing orifice, and (2) an open position spaced from the closed position. The lid includes an occlusion member for occluding the dispensing orifice when the lid is in the closed position. The lid includes a finger well to facilitate opening the lid. The finger well is formed by deflection or deformation of a portion of the lid from an as-molded convex condition to a concave condition relative to the exterior of the lid.

11 Claims, 2 Drawing Sheets

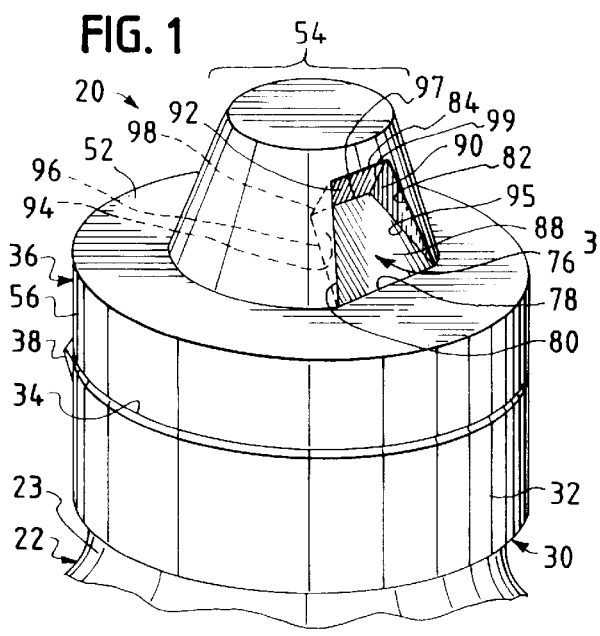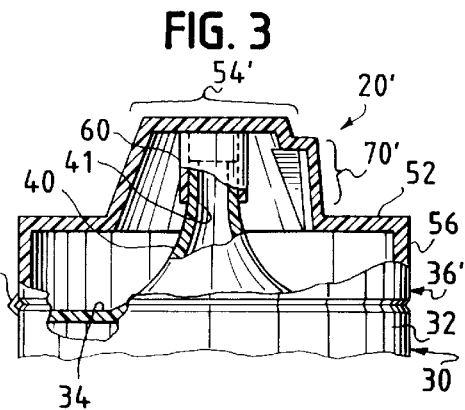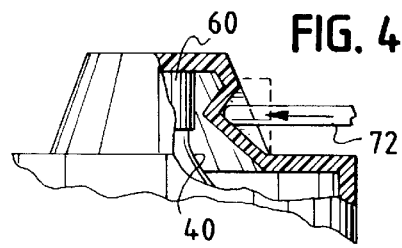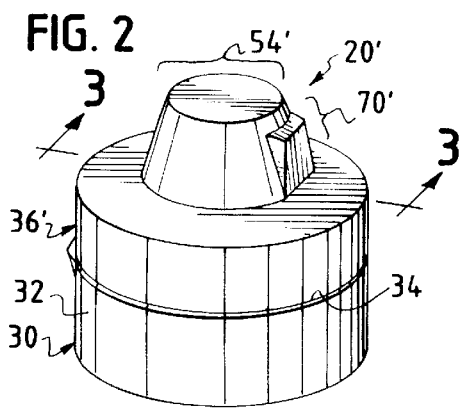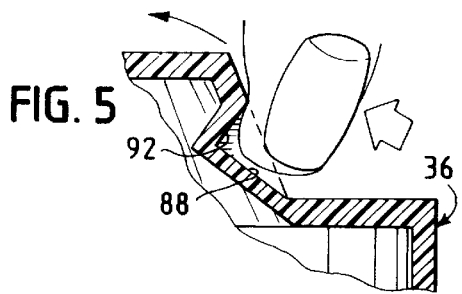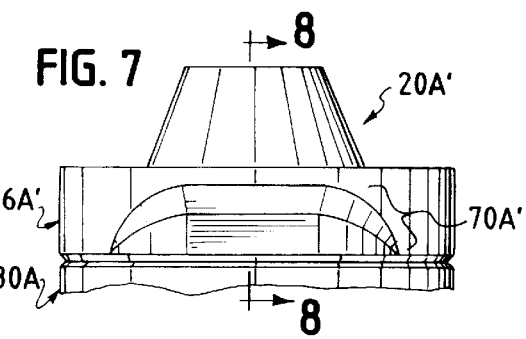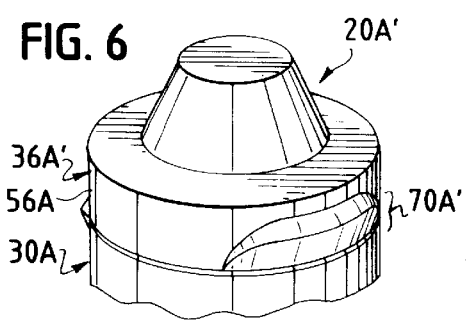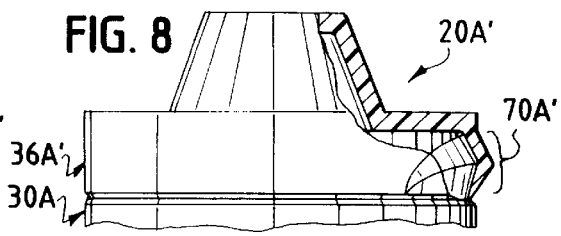

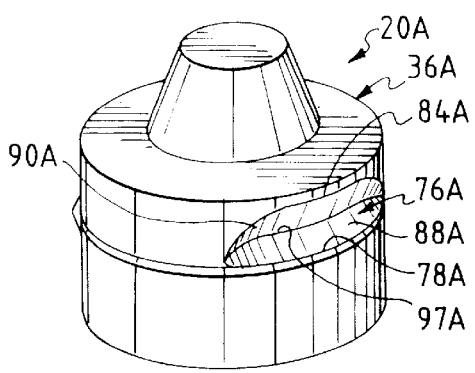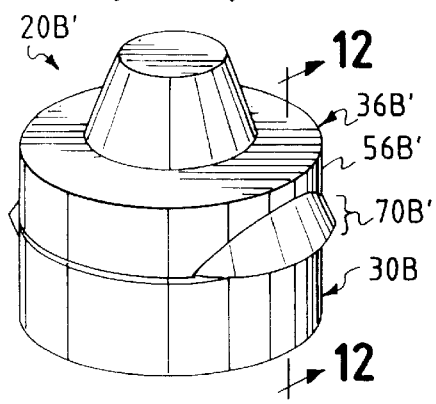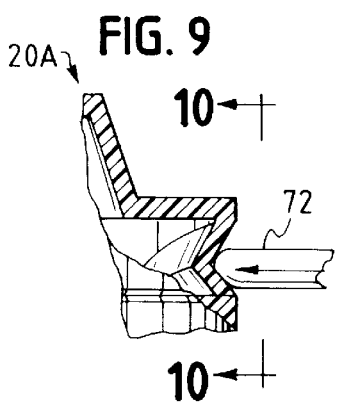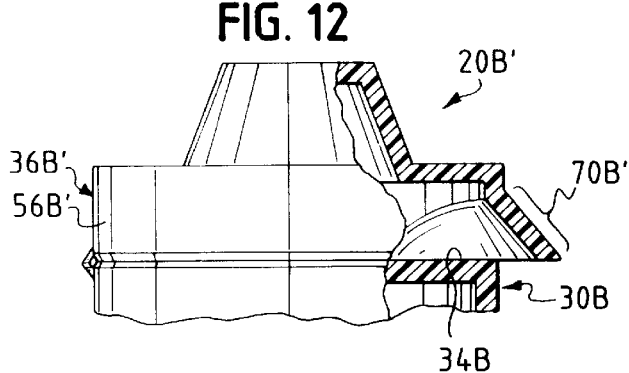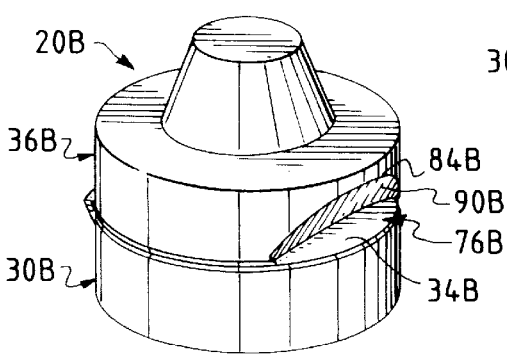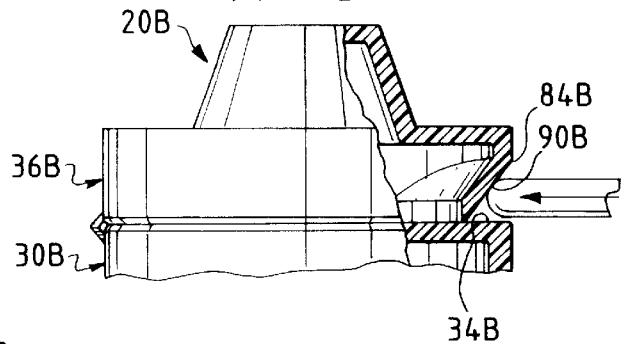

METHOD FOR MAKING A DISPENSING CLOSURE WITH A FINGER WELL FORMED AFTER MOLDING OF THE DISPENSING CLOSURE

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to dispensing closures which are molded, e.g., from thermoplastic materials. Such closures are typically mounted over the opening in a flexible container which can be squeezed to dispense the contents from the container.

BACKGROUND OF THE INVENTION

AND

TECHNICAL PROBLEMS POSED BY THE PRIOR ART

Dispensing closures with lids, especially hinged lids, are typically provided with a finger-receiving area or finger well for accommodating the end of the user's finger so that the user can more easily push on, and lift up, the lid to open the closure. Such finger well constructions generally function satisfactorily. However, providing a finger well in a closure lid requires the manufacturer to design an appropriate structure and then implement the creation of that structure in the molded closure during the manufacturing process. This increases the complexity and cost of the manufacturing process.

Specifically, a dispensing closure molded from a thermoplastic material typically has a body or base which mounts to the container and which defines a dispensing orifice or spout with a dispensing orifice. The closure also has a lid which is typically attached to the base by a hinge and which is movable between a closed position occluding the dispensing orifice and an open position accommodating dispensing of the container contents through the spout or orifice. The lid typically has a finger well located about 180° from the hinge, and the finger well is typically a recess or depression in a portion of the lid which is molded into the lid during the molding of the dispensing closure. Such finger well constructions require special mold features, and this can include across-the-parting-line shut-offs, undercuts, inserts, and the like. Such mold features require additional engineering, design, fabrication, etc. This increases the cost of the mold. Further, such additional mold features may often require additional maintenance over time as the mold is used.

It would be desirable to provide an improved dispensing closure construction with a finger well that would require a minimum of special mold features and that would require less complex mold features with respect to forming the finger well.

The present invention provides an improved dispensing closure which can accommodate designs having the above-discussed benefits and features.

BRIEF SUMMARY OF THE INVENTION

According to one aspect of the present invention, a dispensing structure is provided for a container that has an opening to the container interior. The dispensing structure includes a base or body for extending around the container opening and for defining a dispensing orifice. A lid is molded from at least one synthetic polymer material and is hingedly connected to the body for movement between (1) a closed position over the body dispensing orifice, and (2) an open position spaced from the closed position. The lid includes an occlusion member for occluding the dispensing orifice when the lid is in the closed position. The lid includes a finger well to facilitate opening the lid. The finger well is formed by deflection or deformation of a portion of the lid from an as-molded convex condition to a concave condition relative to the exterior of the lid.

According to yet another aspect of the present invention, a method is provided for making a dispensing structure for a container that has an opening to the container interior. The method includes the step of molding a body and a lid preform from at least one synthetic material wherein (a) the body is adapted to extend around the container opening and defines a dispensing orifice, (b) the lid preform is hingedly connected to the body and is movable between (1) a closed position over the body dispensing orifice, and (2) an open position spaced from the closed position.

The molding step includes molding the body and lid preform with the lid preform in the open position. The lid preform includes an occlusion member for occluding the dispensing orifice when the lid preform is in the closed position.

The lid preform has a convex portion relative to the exterior of the lid preform. The method further includes the step of moving the lid preform to the closed position.

Finally, the method includes the step, after the molding step, and before, during, or after the step of moving the lid preform to the closed position, of applying a force to the convex portion of the lid preform from the exterior of the lid preform to urge the convex portion into a self-maintained, inwardly concave configuration that changes the lid preform to a lid having a finger well defined by the concave configuration for facilitating opening of the lid.

Another aspect of the present invention includes a method for making a lid for a body of a dispensing structure for a container that has an opening to the container interior wherein the body is adapted to extend around the container opening and defines a dispensing orifice. The method comprises the steps of molding a lid preform from at least one synthetic polymer material wherein the lid preform is adapted to be hingedly connected to the body and is adapted to be movable between (a) a closed position over the body dispensing orifice, and (b) an open position spaced from the closed position. The molded lid preform includes an occlusion member for occluding the body orifice when the lid preform is in the closed position, and the lid preform also includes a convex portion relative to the exterior of the lid preform. The method further includes the step of applying force to the convex portion of the lid preform from the exterior of the lid preform to urge the convex portion into a self-maintained, inwardly concave configuration that changes the lid preform to a lid having a finger well defined by the concave configuration for facilitating opening of the lid.

Yet another aspect of the present invention includes a dispensing structure preform for a container that has an opening to the container interior. The dispensing structure preform comprises (a) a body for extending around the container opening and defining a dispensing orifice; (b) a lid preform molded from at least synthetic polymer material and hingedly connected to the body for movement between (1) a closed position over the body dispensing orifice, and (2) an open position spaced from the closed position. The lid preform includes an occlusion member for occluding the dispensing orifice when the lid preform is in the closed position. The lid preform includes a portion which has been molded in a convex configuration relative to the exterior of the lid preform and which can be subsequently urged to a self-maintained, concave configuration that changes the lid preform to a lid having a finger well defined by the concave configuration for facilitating opening of the lid.

According to yet another aspect of the present invention, a lid preform is provided for a body of a dispensing structure for a container that has an opening to the container interior wherein the body is adapted for extending around the container opening and defines a dispensing orifice. The lid preform is molded from at least one synthetic polymer material and is adapted to be hingedly connected to the body for movement between (1) a closed position over the body dispensing orifice, and (2) an open position spaced from the closed position. The lid preform includes an occlusion member for occluding the dispensing orifice when the lid preform is in the closed position. The lid preform also includes a portion which has been molded in a convex configuration relative to the exterior of the lid preform and which can be subsequently urged to a self-maintained, concave configuration that changes the lid preform to a lid having a finger well defined by the concave configuration for facilitating opening of the lid.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is a fragmentary, perspective view of a dispensing structure of the present invention embodied in a dispensing closure mounted to a container and shown in the closed condition;

FIG. 2 is a fragmentary, perspective view of the dispensing closure preform prior to being formed into the dispensing closure shown in FIG. 1;

FIG. 3 is an enlarged, fragmentary, cross-sectional view taken generally along the plane 3—3 in FIG. 2;

FIG. 4 is a view similar to FIG. 3, but FIG. 4 shows a step in the manufacturing process wherein a convex portion of the lid preform part of the closure preform is urged by a tool into a self-maintained, inwardly concave configuration which changes the lid preform to a lid having a finger well defined by the concave configuration for facilitating opening of the lid;

FIG. 5 is an enlarged, fragmentary, cross-sectional view similar to FIG. 4, but FIG. 5 shows how a user can apply an opening force to the lid with the user's finger engaging the finger well of the lid;

FIGS. 6–10 illustrate a second embodiment of the present invention, and FIG. 6 is a fragmentary, perspective view of the second embodiment of the dispensing structure preform;

FIG. 7 is a fragmentary, front elevational view of the lid preform portion of the dispensing structure preform;

FIG. 8 is a fragmentary, partial, cross-sectional view taken generally along the plane 8—8 in FIG. 7;

FIG. 9 is a fragmentary, cross-sectional view similar to FIG. 8, but FIG. 9 shows a further step in the manufacturing process wherein a tool is applied to the lid preform part of the dispensing structure preform to urge a convex portion into a self-maintained, inwardly concave configuration that changes the lid preform to a lid having a finger well defined by the concave configuration for facilitating opening of the lid;

FIG. 10 is a perspective view similar to FIG. 6, but FIG. 10 illustrates the completed dispensing structure after formation of the finger well in the lid;

FIGS. 11–14 illustrate a third embodiment of the present invention, and FIG. 11 is a perspective view of a third embodiment of the dispensing structure preform;

FIG. 12 is a enlarged, fragmentary, partial cross-sectional view taken generally along the plane 12—12 in FIG. 11;

FIG. 13 is a view similar to FIG. 12, but FIG. 13 shows a further step in the manufacturing process wherein a tool is applied to the lid preform part of the dispensing structure preform to urge a convex portion to a self-maintained, inwardly concave configuration that changes the lid preform to a lid having a finger well defined by the concave configuration for facilitating opening of the lid; and FIG. 14 is perspective view similar to FIG. 11, but FIG. 14 shows the completed lid after withdrawal of the tool used to form the finger well.

DETAILED DESCRIPTION

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the dispensing structure of this invention is described in the normal (upright) operating position, and terms such as upper, lower, horizontal, etc., are used with reference to this position. It will be understood, however, that the dispensing structure of this invention may be manufactured, stored, transported, used, and sold in an orientation other than the position described.

A presently preferred embodiment of a dispensing structure or system of the present invention is illustrated in FIGS. 1–5. FIGS. 2 and 3 show the as-molded preform condition of the dispensing structure designated generally by the reference number 20', and FIGS. 1, 4, and 5 show the final form of the dispensing structure 20 after reconfiguration of a portion of the structure. In the preferred embodiment illustrated, the final configuration of the dispensing structure 20 is provided in the form of a closure 20 which is adapted to be mounted on a container 22 (FIG. 1). The body of the container 22 may have any suitable configuration. The container 22 could have an upwardly projecting neck 23 which is adapted to receive the closure 20 and which may have a different cross-sectional shape than the container body. The container 22 has a conventional mouth or opening (not visible in FIG. 1) defined by the neck 23 or other suitable structure in the upper end of the container 22.

The container mouth or opening provides access to the container interior and to a product contained therein. The product may be, for example, a liquid comestible product. The product could also be any other solid, liquid, or gaseous material, including, but not limited to, a food product, a personal care product, an industrial or household cleaning product, or other chemical compositions, e.g., compositions for use in activities involving manufacturing, commercial or household maintenance, construction, agriculture, etc.

The container 22 is typically a squeezable container having a flexible wall or walls which can be grasped by the user and squeezed or compressed to increase the internal pressure within the container 22 so as to force the product out of the container 22 through the closure 20 when the closure is open. The container wall typically has sufficient, inherent resiliency so that when the squeezing forces are removed, the container wall returns to its normal, unstressed shape. Such a squeezable wall structure is preferred in many applications, but may not be necessary or preferred in other applications. Other means could be provided for pressurizing the product inside the container in order to dispense the product. For example, a manually operable plunger or piston (not illustrated) could be provided at the bottom end of the container.

Although the container 22, per se, need not necessarily form a part of the present invention, per se, it will be appreciated that the dispensing structure or system of the present invention may be provided as a unitary portion, or extension, of the top of the container 22. However, in the preferred embodiment illustrated, the dispensing structure or closure 20 is a separate element or closure which is adapted to be mounted to a previously manufactured container 22 which has an opening to the container interior.

As shown in FIG. 1, the preferred embodiment closure or dispensing structure 20 of the present invention includes a base portion or body 30 and a lid 36. The lid 36 is formed by deforming a previously molded lid preform 36' as described in detail hereinafter.

The body 30 may be characterized as having or defining a skirt 32 for receiving the upper end of the container neck 23. The skirt 32 includes suitable connecting means, such as a conventional snap-fit bead (not visible) adapted to be engaged with a mating container groove (not visible). The closure body 30 and container 22 could also be attached with a mating thread engagement.

Also, the closure body 30 could be permanently fixed to the container 22 by means of induction melting, ultrasonic melting, gluing, or the like, depending upon the materials used for the closure body 30 and container 22. As previously mentioned, the closure body could also be formed as a unitary part, or extension, of the container 22.

As illustrated in FIGS. 1 and 3, the top of the closure body 30 defines a peripheral deck or annular end wall 34 for limiting the closing movement of the lid 36 (and of the initially molded lid preform 36' (FIG. 3) described in detail hereinafter) which is connected to the top of the skirt 32 with a hinge 38. The deck 34 may be characterized as the upper, end surface of the closure body skirt 32. A dispensing spout 40 (FIG. 3) extends from the central portion of the closure body 30, and the base of the spout 40 merges with the peripheral deck 34. As shown in FIG. 3, the peripheral deck 34 and spout 40 together form the upper end wall of the closure body 30 and also define a dispensing orifice 41 through the closure body 30.

One example of a closure body with a dispensing spout that may be employed with the lid of the present invention is identified by the reference number "50" in the U.S. Pat. No. 5,642,824 which is incorporated herein by reference thereto to the extent not inconsistent herewith. The particular design of the closure body 30 may be of any suitable configuration, the details of which form no part of the present invention.

Preferably, the lid preform 36' (FIGS. 2 and 3) is connected to the closure body 30 with a snap-action hinge 38 of the type disclosed in the above-identified U.S. Pat. No. 5,642,824. Preferably, such a snap-action hinge provides a bi-stable action for maintaining the lid in a substantially closed position (FIG. 1) or in a substantially open position (not illustrated).

The lid preform 36' includes an annular end wall 52, a generally frustoconical central portion 54' projecting upwardly from the inner diameter of the annular end wall 52, and a peripheral skirt 56 depending from the outer circumference of the annular end wall 52. The skirt 56 is adapted to limit the movement of the lid preform 36' (and subsequently formed lid 36) to the closed position by engaging the body deck 34.

The lid preform 36' (and subsequently formed lid 36) includes a downwardly projecting sealing collar 60 (FIG. 3) for sealingly engaging the upper, outside end portion of the closure body spout 40 when the lid preform 36' (or subsequently formed lid 36) is closed.

The sealing collar 60 functions as an occlusion member for occluding the dispensing orifice in the spout 40 when the lid 36 is in the closed position. It will be appreciated that the occlusion member or collar 60 may have other suitable configurations if used with a closure body having a differently shaped dispensing structure. For example, the closure body 30 need not have an upwardly projecting spout 40. Rather, the closure body 30 may have a generally flat deck defining a dispensing orifice with or without a small, surrounding collar or flange. The lid could then be provided with a sealing plug or spud in place of the illustrated sealing collar 60. Such a plug or spud would enter into the dispensing orifice to function as an occlusion member when the lid is closed.

The lid preform collar 60, end wall 52, and skirt 56 have the same configuration in the final lid 36. However, the shape of the lid preform central portion 54' is changed in the final lid 36 (FIG. 1) to the extent that a special convex portion 70' (FIGS. 2 and 3) in the lid preform central portion 54' is deformed inwardly to form a finger well 76 (FIG. 1) in the final configuration of the lid central portion which is designated with the reference number 54 in FIG. 1. Specifically, as shown in FIGS. 2 and 3, the lid preform 36' is initially molded with the convex portion 70' in the frustoconical portion 54'. The convex portion 70' is convex relative to the exterior of the lid preform 36'.

In the preferred embodiment of the dispensing structure preform 20', the body 30, lid preform 36', and hinge 38 are all molded together as a unitary structure. The dispensing structure preform 20' is initially molded with the lid preform 36' in an open condition relative to the closure body 30. Typically, the lid preform 36' is molded in an orientation in which the lid preform 36' is in a substantially 180° open condition relative to the closure body 30.

Subsequently, the dispensing structure preform 20' is removed from the mold. In a post-molding operation, the lid preform 36' is closed over the closure body 30. Preferably, during the closing operation, the lid preform convex portion 70' is urged inwardly to a self-maintained, concave configuration that changes the lid preform 36' to the final configuration lid 36 having the finger well 76 defined by the concave configuration for facilitating opening of the lid 36. The convex portion 70' may be urged inwardly with a suitable tool 72 that applies force to the convex portion 70' as illustrated in FIG. 4. The tool 72 may be moved against the convex portion 54' as the lid preform 36' is being closed or just after the lid preform 36' is closed. Alternatively, the tool 72 may be moved against the convex portion 70' to form the final lid configuration before the lid preform 36' is closed.

With reference to FIG. 1, the finger well 76 may be characterized as a recess having an entrance defined by four peripheral bend lines in the surface of the lid: bend line 78, bend line 80, bend line 82, and bend line 84. The finger well 76 may also be characterized as being defined by four surfaces which are bent inwardly at the peripheral bend lines 78, 80, 82, and 84, and the four surfaces are designated in FIG. 1 by the reference numbers 88, 90, 92, and 94. The finger well 76 has five internal bend lines 95, 96, 97, 98, and 99. The five internal bend lines 95, 96, 97, 98, and 99 are inwardly of the recess entrance of the finger well 76.

After the finger well 76 has been formed, a user can readily position the user's finger in the finger well 76 and push upwardly (particularly on the slanted surface 92 as shown in FIG. 5) to lift the lid 36 upwardly away from the spout 40 to the open position.

With respect to the first embodiment illustrated in FIGS. 1–5, it will be appreciated that the finger well 76 may be formed higher up in the frustoconical central portion 54 if desired. Specifically, the bend line 78 along the lid annular end wall 52 could be located higher up on the frustoconical surface of the lid.

A second embodiment of the dispensing structure is illustrated in FIGS. 6–10 wherein FIGS. 6, 7, and 8 illustrate an as-molded dispensing structure preform 20A', and FIGS. 9 and 10 illustrate the completed dispensing structure 20A. The dispensing structure preform 20A' and completed structure 20A each has a closure body 30A which may be identical with the closure body 30 described above with reference to the first embodiment illustrated in FIGS. 1–5. The second embodiment preform 20A' includes a lid preform 36A' which is similar to the lid preform 36' described above with reference to the first embodiment illustrated in FIGS. 1–5, except that the second embodiment lid preform 36A' has differently shaped convex portion which results in a differently shaped finger well in the final lid.

Specifically, in the second embodiment, the lid preform 36A' has a convex portion 70A' on a peripheral skirt 56A' as shown in FIG. 6. As shown in FIG. 9, the convex portion 70A' is pushed inwardly in a final step of the manufacturing process by a tool 72 (or by some other suitable means) to form the final lid 36A with a finger well 76A as can be clearly seen in FIG. 10. The finger well 76A is a recess having an entrance defined by two, curved peripheral bend lines 78A and 84A. The finger well recess is defined by two surfaces, surface 88A and surface 90A which are bent inwardly at the peripheral bend lines 78A and 84A, respectively. Inwardly of the peripheral bend lines 78A and 84A, the two surfaces 88A and 90A are joined by an internal bend line 97A which is located inwardly of the entrance to the finger well 76A.

A third embodiment of the dispensing structure of the present invention is illustrated in FIGS. 11–14 wherein FIGS. 11 and 12 illustrate the as-molded preform 20B', and FIGS. 13 and 14 illustrate the final configuration of the dispensing structure 20B.

The third embodiment of the dispensing structure preform 20B' is substantially similar to the second embodiment of the dispensing structure preform 20A' discussed above with reference to FIGS. 6–10. The third embodiment dispensing structure preform 20B' differs, however, in the shape of the lid preform and final finger well.

In particular, the third embodiment dispensing structure preform 20B' includes a closure base or body 30B and a hingedly attached lid preform 36B' (FIGS. 11 and 12). The lid is initially molded as a lid preform 36B' having a downwardly depending skirt 56B' (FIGS. 11 and 12). The preform skirt 56B' has an outwardly convex portion 70B'. After the lid preform 36B' is molded, the outwardly convex portion 70B' is urged inwardly, as with a tool 72 (FIG. 13), so as to define a self-maintained, inwardly concave configuration that changes the lid preform 36B' to the final configuration lid 36B. The inwardly concave configuration defines a finger well 76B for facilitating opening of the lid 36B.

As can be seen in FIG. 14, the closure body 30B has a deck or end wall 34B. The end wall 34B can be identical with the end wall 34 of the first embodiment of the dispensing structure illustrated in FIG. 3. Thus, in such a configuration, the deck or end wall 34B merges with a spout (not visible under the lid 36B in FIG. 14). The outer annular portion of the end wall or deck 34B is exposed at the finger well 76B. The finger well 76B may be characterized as a recess having an entrance defined by one curved, peripheral bend line 84B in the lid 36B and by the outer edge of the closure body deck or end wall 34B. The finger well 76B is further defined, at least in part, by a lid portion 90B which is bent inwardly at the peripheral bend line 84B and by the confronting, exposed portion of the closure body deck or end wall 34B.

With respect to the three illustrated embodiments, it will be appreciated that the shapes of the preform convex configurations in the as-molded condition may be altered to provide differently shaped finger wells. It will be appreciated that due to compression-tension design parameters in the plastic wall of the lid, the convex portion or bowed out portion of the lid preform accommodates deformation into the inverted, or recessed, condition so as to create the finger well, and the compression and tension forces maintain the lid wall portions in the deformed condition defining the finger well.

Further, the lid need not have a frustoconical central portion (e.g., portion 54 in FIG. 1). Instead, the lid could be generally cylindrical with a flat top end, and the finger well could be formed in the cylindrical sidewall (as the finger well recesses are formed in the lid skirts in the second and third embodiments illustrated in FIGS. 6–14).

It will also be appreciated that the lid need not be connected to the base or body with a hinge that is molded as a unitary extension of the lid and body. Rather, the hinge could include a mechanical connection between a separately molded lid and a separately molded body. The lid (or body) could be separately molded with a hinge pin or pins, and the body (or lid) could be separately molded with a bearing structure for receiving the hinge or pin or pins. The two molded parts could then be snap-fit together at the hinge area.

It will be readily apparent from the foregoing detailed description of the invention and from the illustrations thereof that numerous variations and modifications may be effected without departing from the true spirit and scope of the novel concepts or principles of this invention.

What is claimed is:

1. A method for making a lid for a body of a dispensing structure for a container that has an opening to the container interior wherein said body is adapted to extend around said container opening and defines a dispensing orifice, said method comprising the steps of:

(A) molding a lid preform from at least one synthetic polymer material wherein
  (1) said lid preform is adapted to be movable between (a) a closed position over said body dispensing orifice, and (b) an open position spaced from said closed position,
  (2) said lid preform includes an occlusion member for occluding said dispensing orifice when said lid preform is in said closed position, and
  (3) said lid preform has a convex portion relative to the exterior of said lid preform; and
(B) applying a force to said convex portion of said lid preform from said exterior of said lid preform to urge said convex portion into a self-maintained, inwardly concave configuration that changes said lid preform to a lid having a finger well defined by said concave configuration that includes an inwardly bent recessed wall oriented to provide an inwardly slanted finger-engaging surface for facilitating opening said lid.

2. The method in accordance with claim 1 in which step (B) includes pushing said convex portion with a tool.

3. The method in accordance with claim 1 in which step (A) includes molding said lid and body together as a unitary structure joined by a hinge.

4. The method in accordance with claim 1 in which step (A) includes molding said lid preform with (1) a frustoconical central portion, (2) an annular end wall around said frustoconical central portion, and (3) a cylindrical skirt depending from said annular end wall.

5. The method in accordance with claim 4 in which step (A) includes molding said lid preform with said convex portion located in said frustoconical central portion.

6. The method in accordance with claim 4 in which step (A) includes molding said lid preform with said convex portion located in said cylindrical skirt.

7. A method for making a dispensing structure for a container that has an opening to the container interior, said method comprising the steps of:
  (A) molding a body and a lid preform from at least one synthetic polymer material wherein
    (1) said body is adapted to extend around said container opening and defines a dispensing orifice,
    (2) said lid preform is hingedly connected to said body and is movable between (a) a closed position over said body dispensing orifice, and (b) an open position spaced from said closed position, said molding step including molding said body and lid preform with said lid preform in said open position,
    (3) said lid preform includes an occlusion member for occluding said dispensing orifice when said lid preform is in said closed position, and
    (4) said lid preform has a convex portion relative to the exterior of said lid preform;
  (B) moving said lid preform to said closed position; and
  (C) after step (A) and before, during, or after step (B), applying a force to said convex portion of said lid preform from said exterior of said lid preform to urge said convex portion into a self-maintained, inwardly concave configuration that changes said lid preform to a lid having a finger well defined by said concave configuration that includes an inwardly bent, recessed wall oriented to provide an inwardly slanted finger-engaging surface for facilitating opening said lid.

8. The method in accordance with claim 7 in which step (C) includes pushing said convex portion with a tool.

9. The method in accordance with claim 7 in which step (A) includes molding said lid preform with (1) a frustoconical central portion, (2) an annular end wall around said frustoconical central portion, and (3) a cylindrical skirt depending from said annular end wall.

10. The method in accordance with claim 9 in which step (A) includes molding said lid preform with said convex portion located in said frustoconical central portion.

11. The method in accordance with claim 9 in which step (A) includes molding said lid preform with said convex portion located in said cylindrical skirt.

\* \* \* \* \*